United States Patent [19]
Thorlton

[11] Patent Number: 5,551,738
[45] Date of Patent: Sep. 3, 1996

[54] WINDOW LATCH EXTENDER

[76] Inventor: Jerry L. Thorlton, 767 Colonial Way, Greenwood, Ind. 46142

[21] Appl. No.: 206,119

[22] Filed: Mar. 4, 1994

[51] Int. Cl.⁶ .................................................. E05C 17/04
[52] U.S. Cl. .......................... 292/262; 24/598.6; 292/258; 292/288; 292/339; 292/DIG. 14
[58] Field of Search ................................ 24/598.6, 598.5; 296/76; 294/93; 200/331, 338; 292/246, 249, 28, 31, 262, 258, 288, 299, 339, DIG. 14, DIG. 43, DIG. 61

[56] References Cited

U.S. PATENT DOCUMENTS

| | | | |
|---|---|---|---|
| 501,725 | 7/1893 | Kursh | 24/598.5 |
| 591,429 | 10/1897 | Skeie | 24/598.6 |
| 775,678 | 11/1904 | Lawhead | 24/598.5 |
| 1,250,500 | 12/1917 | Pipp | 294/93 |
| 1,308,055 | 7/1919 | Durham | 24/598.5 |
| 1,454,595 | 5/1923 | Ashley | 292/DIG. 14 |
| 2,200,701 | 5/1940 | Moore | 292/31 |
| 2,556,113 | 6/1951 | Shaw et al. | 292/246 |
| 2,618,497 | 11/1952 | Gardels . | |
| 2,840,898 | 7/1958 | Yeo | 24/598.6 |
| 2,973,217 | 2/1961 | Gregoire | 292/DIG. 43 |
| 3,180,668 | 4/1965 | Brown . | |
| 4,070,050 | 1/1978 | Glock et al. . | |
| 4,124,240 | 11/1978 | Adelberg . | |
| 4,278,280 | 7/1981 | Rashbaum . | |
| 4,393,754 | 7/1983 | Hough et al. . | |
| 4,593,946 | 6/1986 | Rich . | |
| 4,667,993 | 5/1987 | Hannesson et al. . | |
| 4,870,925 | 10/1989 | Troutman | 296/76 |
| 5,035,449 | 7/1991 | Shiratori et al. . | |
| 5,163,724 | 11/1992 | Conte . | |
| 5,165,742 | 11/1992 | Frayne . | |

FOREIGN PATENT DOCUMENTS 0000765 of 1875 United Kingdom ................... 24/598.6

OTHER PUBLICATIONS

Hatch Vent Device: Part #17066, 1984–94 Hatch Vent; Mid America Designs, Inc. Catalog; Spring, 1994; Cover Page and p. 118.
Hatch Vent Device: Same device as disclosed in AR above: FIGS. 1–5 (five photographs).

*Primary Examiner*—Darnell M. Boucher
*Attorney, Agent, or Firm*—Barnes & Thornburg

[57] ABSTRACT

A system is configured to hold a pivotable hatch of a vehicle in a partially open position and to close a switch indicating that the pivotable hatch is open. The system includes a one piece latch extender including a base configured to engage a locking mechanism of the vehicle and coupling member formed on the latch extender. The coupling member is configured to apply a spring force to a hasp on the hatch of the vehicle to couple the latch extender to the hasp and to position the base a predetermined distance from the hasp so that the pivotable hatch remains in a partially open position upon engagement of the base with the locking mechanism. The system also includes an auxiliary post configured to be attached to a post coupled to the hatch of the vehicle to engage and close the switch when the pivotable hatch is in the partially open position.

18 Claims, 4 Drawing Sheets

WINDOW LATCH EXTENDER

BACKGROUND AND SUMMARY OF THE INVENTION

The present invention relates to a latch extender. More particularly, the present invention relates to a latch extender configured to be coupled to an existing hasp on a pivotable hatch or window of a vehicle for holding the hatch or window of the vehicle in a partially open position to permit ventilation of an interior region of the vehicle.

Pivotable vehicle hatches and windows are used to provide access to a rear area of the vehicle. While the vehicle is moving, it is desirable to partially open the hatch or window to improve air ventilation through the vehicle. Generally, however, pivotable hatches or windows can only be positioned in either a fully open position or a closed position. Air cylinders are typically coupled to the pivotable hatch or window to move the hatch or window to its fully open position automatically when the hasp is disengaged from a locking mechanism.

It is known to provide devices to hold a hatch or window in a partially open position. These known devices are often large and heavy and require the use of a tool to install the device on the vehicle. Such large heavy devices are difficult to transport and if dropped while installing the device on the vehicle, may cause extensive damage to the vehicle body or paint. Having to use a tool during installation of the device also increases the time required for installation and necessitates carrying the tool in the car at all times.

One such prior art device is illustrated in U.S. Pat. No. 5,165,743 to Frayne. In this device, a bolt-on latch extender is configured to be coupled to an existing window hasp. The Frayne device includes a threaded body portion, a separate facing plate, and a wing bolt to secure the device to a window hasp. Therefore, it is relatively easy for a thief to unscrew the bolt of the Frayne device, remove the extender, and gain access to a rear storage compartment of the vehicle.

One object of the present invention is to provide an improved latch extender which is lightweight, small, and capable of being installed without a tool. Advantageously, the improved latch extender of the present invention is easier to transport, less likely to damage the vehicle, and easier to install.

Another object of the present invention is to provide a one-piece latch extender which provides improved protection against removal of the device by a thief to gain access to a rear storage compartment of the vehicle. In the partially open position, the rear hatch or window provides enough room to permit air ventilation through the interior region of the vehicle, but does not provide a large enough gap to permit a thief to reach completely into the rear storage compartment.

According to one aspect of the present invention, a latch extender is provided for extending a hasp configured to engage a locking mechanism. The latch extender includes a base configured to engage the locking mechanism, and a first side leg extending upwardly from the base. The first side leg has a proximal end coupled to the base and a distal end. The latch extender also includes a second side leg extending upwardly from the base spaced apart from the first side leg. The second side leg has a proximal end coupled to the base and a distal end. The latch extender further includes a first tang formed at the distal end of the first side leg, and a second tang formed at the distal end of the second side leg. The first and second tangs are configured to engage the hasp to couple the latch extender to the hasp.

In the illustrated embodiment, the base has a longitudinal axis, the first tang has a longitudinal axis that is aligned generally normal to the longitudinal axis of the base, and the second tang has a longitudinal axis that is aligned generally normal to the longitudinal axis of the base. The first side leg has a longitudinal axis, and the second side leg has a longitudinal axis. The longitudinal axis of the first tang is aligned at an acute angle relative to the longitudinal axis of the first side leg, and the longitudinal axis of the second tang is aligned at an acute angle relative to the longitudinal axis of the second side leg. The first and second tangs extend away from the first and second side legs, respectively, in opposite directions.

Also in the illustrated embodiment, the first side leg and the second side leg are configured to converge axially relative to the longitudinal axis of the base as the distance of the first and second side legs from the base increases. The first side leg and the second side leg are also configured to diverge radially relative to a longitudinal axis of the base as the distance of the first and second side legs from the base increases. In other words, the first and second side legs are aligned at compound angles relative to each other.

In one illustrated embodiment, the first side leg and the second side leg are configured to apply a spring force to the hasp to hold the first and second tangs in engagement with the hasp to couple the latch extender to the hasp. In another illustrated embodiment, the first and second tangs are generally U-shaped hooks formed on the distal ends of the first and second side legs, respectively, for engaging the hasp to couple the extender to the hasp. The first and second generally U-shaped hooks extend away from the first and second side legs, respectively, in opposite directions. The first and second generally U-shaped hooks each include a shoulder and an arm spaced apart form the shoulder. The shoulder and the arm are configured to apply a spring force to the hasp to couple the extender to the hasp.

According to another aspect of the present invention, a latch extender is configured to be coupled to a hasp of a pivotable hatch of a vehicle and to engage a locking mechanism to hold the hatch in a partially open position. The latch extender includes a body portion having a base configured to engage the locking mechanism and a coupling member coupled to the body portion. The coupling member is configured to apply a spring force to the hasp to couple the body portion to the hasp and to position the base a predetermined distance from the hasp so that the pivotable hatch remains in a partially open position upon engagement of the base with the locking mechanism.

The coupling member is formed integrally with the body portion. In one illustrated embodiment, the coupling member includes a pair of spaced apart spring beams for applying the spring force to the hasp and means for engaging the hasp to couple the spring beams to the hasp. In another illustrated embodiment, the coupling member includes a pair of generally U-shaped hooks configured to apply a spring force to the hasp to couple the extender to the hasp.

According to a further aspect of the present invention, a system is configured to hold a pivotable hatch of a vehicle in a partially open position and to close a switch indicating that the pivotable hatch is open. The system includes a one piece latch extender including a base configured to engage a locking mechanism of the vehicle and coupling member formed on the latch extender. The coupling member is configured to apply a spring force to a hasp on the hatch of the vehicle to couple the latch extender to the hasp and to position the base a predetermined distance from the hasp so that the pivotable hatch remains in a partially open position upon engagement of the base with the locking mechanism. The system also includes an auxiliary post configured to be attached to a post coupled to the hatch of the vehicle to engage and close the switch when the pivotable hatch is in the partially open position.

In the illustrated embodiment, the auxiliary post is formed to include a longitudinal opening at one end configured to slide over the post of the hatch. The auxiliary post is also formed to include a pair of slots communicating with the longitudinal opening. The system further includes a spring clip located in the slots for engaging the post of the vehicle to secure the auxiliary post to the post of the vehicle.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
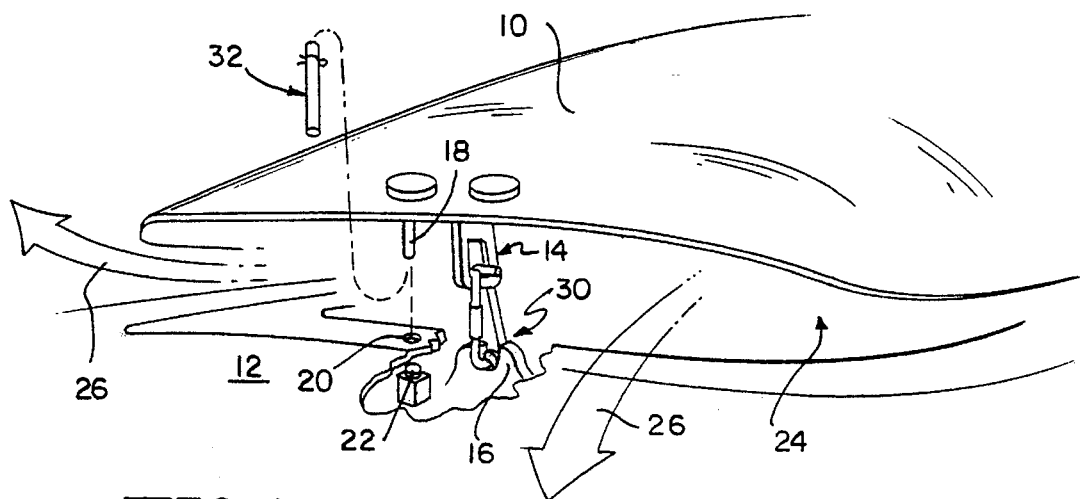
FIG. 1 is a perspective view illustrating a pivotable hatch-type window of a vehicle, a latch extender of the present invention coupled to a window hasp and extending downwardly to engage a locking mechanism, and an auxiliary post configured to be coupled to a post of the window to engage and close a control switch.

Referring now to the drawings, FIG. 1 illustrates a perspective view of a pivotable rear hatch-type window 10 of an automobile. Although a window 10 is illustrated in FIG. 1, it is understood that the present invention may be used with any type of pivotable hatch or window designed to provide access to the interior region of a vehicle. Window 10 includes a window hasp 14 configured to engage locking mechanism 16 to secure the window 10 in a closed position resting against car body 12. A post 18 is also coupled to window 10. Post 18 is designed to move through an aperture 20 formed in vehicle body 12 and depress and close a switch. When post 18 moves away from switch 22, a light is turned on in a rear storage compartment of the vehicle. Switch 22 can also control a security system or a warning signal to alert a driver that the hatch window 10 is open. When hatch window 10 is closed during operation of vehicle 12, it is difficult to obtain ventilation through interior region 24 of vehicle 12. Typically, vehicle 12 should not be operated with hatch window 10 in a fully open position. The present invention is designed to permit the window 10 to remain in a secure, partially open position illustrated in FIG. 1 while the vehicle 12 is in operation. This permits cross ventilation of interior region 24 by permitting air to flow out of interior region in the direction of arrows 26.

The present invention provides an improved vehicle latch extender 30 configured to be coupled to window hasp 14 and engage locking assembly 16 to hold hatch window 10 in the partially open position of FIG. 1. The present invention also includes an auxiliary post 32 configured to be coupled to post 18 of window to provide an extension which closes switch 22.

Figure 4:
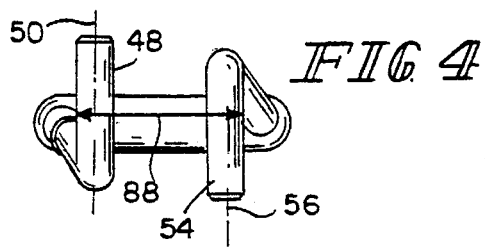
FIG. 4 is a top plan view of the latch extender of FIG. 2.
Figure 2:
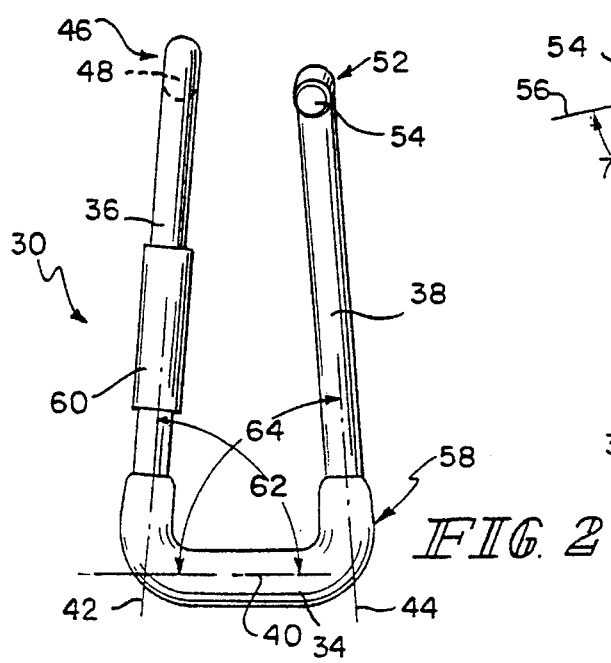
FIG. 2 is a side elevational view of the latch extender of the present invention.
Figure 3:
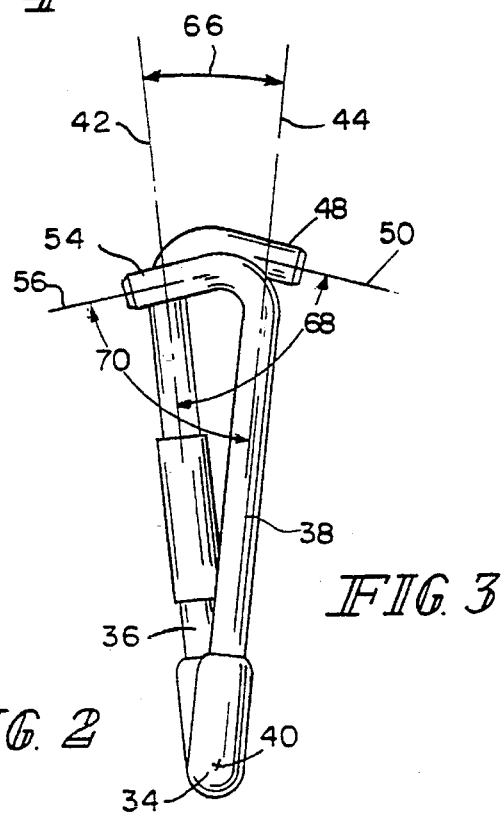
FIG. 3 is an end elevational view of the latch extender of FIG. 2.

Details of one embodiment of the vehicle latch extender 30 are illustrated in FIGS. 2–4. As illustrated in FIG. 2, latch extender 30 includes a base 34 and first and second upwardly extending side legs 36 and 38. Base 34 has a longitudinal axis 40. Side legs 36 and 38 have longitudinal axes 42 and 44, respectively. A distal end 46 of first side leg 36 includes a first outwardly extending projection or tang 48 having a longitudinal axis 50 as best illustrated in FIGS. 3 and 4. A distal end 52 of second side leg 38 is formed to include an outwardly extending projection or tang 54 having a longitudinal axis 56 as best illustrated in FIGS. 3 and 4.

Base 34 and proximal end portions of first side leg 36 and second side leg 38 are covered with a protective sleeve 58 made from a ductile material. Preferably, sleeve 58 is made from plastisol. Sleeve 58 prevents rattling of latch extender 30 in locking mechanism 16. In addition, first side leg 38 includes a label 60 to identify that first side leg 36 is slightly longer than second side leg 38 for reasons discussed below.

As illustrated in FIG. 2, axis 42 of first side leg 36 is aligned at a predetermined acute angle 62 relative to axis 40 of base 34. Axis 44 of second side leg 38 is also aligned at a predetermined acute angle 64 relative to axis 40 of base 34. Preferably, both acute angles 62 and 64 are about 85°. In the illustrated embodiment, angle 62 is 85° 42' 31". Also in the preferred embodiment, angle 64 is 85° 28' 32". In addition, first side leg 36 and second side leg 38 are radially displaced about axis 40 of base 34 by an angle 66 as illustrated in FIG. 3. Preferably, angle 66 is about 10°. In the illustrated embodiment, angle 66 is 10° 39' 19". In other words, first side leg 36 and second side leg 38 converge axially relative to longitudinal axis 40 of base 34 as the distance of first and second side legs 36 and 38 from base 34 increases. First side leg 36 and second side leg 38 diverge radially relative to longitudinal axis 40 of base 34 as the distance from first and second side legs 36 and 38 from base increases. Therefore, side legs 36 and 38 are aligned at compound angles relative to each other.

FIG. 3 also illustrates that tangs 48 and 54 are bent downwardly relative to longitudinal axis 42 and 44 of side legs 36 and 38, respectively. Accordingly, axis 50 of tang 48 is aligned at a predetermined acute angle 68 relative to axis 42 of first side leg 36. Axis 56 of tang 54 is aligned at a predetermined acute angle relative to axis 44 of second side leg 38. Preferably, angles 68 and 70 are both about 70°. In the illustrated embodiment angles 68 and 70 are both 69° 35' 44".

Figure 5:
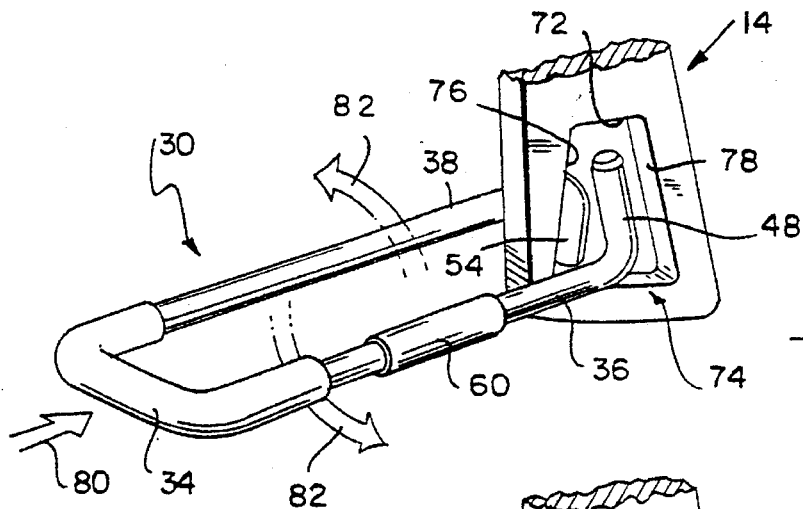
FIGS. 5–7 illustrate the steps for one method of installing the latch extender onto the hasp of the window so that first and second tangs formed on first and second side legs, respectively, of the extender engage and apply a spring force to the hasp to couple the latch extender to the hasp and position a base of the latch extender a predetermined distance below the hasp.
Figure 6:
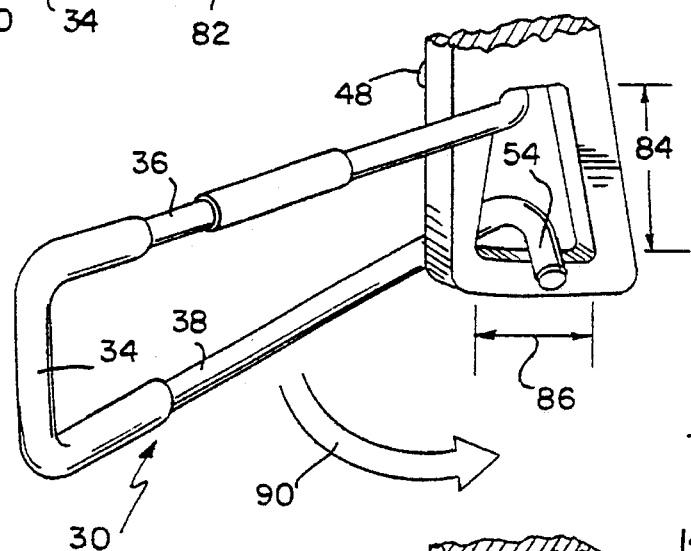
Figure 7:
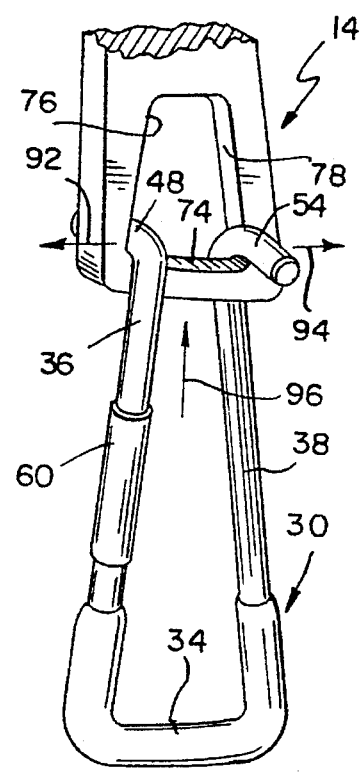

FIGS. 5–7 illustrate installation of latch extender 30 into window hasp 14 of a vehicle. A typical window hasp 14 for a Corvette has an opening defined by a relatively short top wall 72, a wider bottom wall 74, and angled sidewalls 76 and 78. Bottom wall 74 slopes downwardly from sidewall 76 to sidewall 78. In other words, the location of wall 74 adjacent sidewall 78 is lower than the position of sidewall 74 adjacent sidewall 76. It is important that the shorter side leg 38 is positioned adjacent side wall 78 to compensate for the ramped wall 74. The longer side leg 36 is marked with label 60. As illustrated in FIG. 5, latch extender 30 is moved in the direction of arrow 80 so that tangs 48 and 54 are located on opposite sides of window hasp 14. Latch extender 30 is then rotated in the direction of arrows 82 so that tangs 48 and 50 extend through hasp 14. The vertical dimension 84 of hasp 14 is greater than the horizontal dimension 86 of hasp 14. Preferably, the distance between tangs 48 and 54 illustrated by dimension 88 in FIG. 4 is less than dimension 84, but greater than dimension 86. Therefore, tangs 48 and 54 can be easily inserted to the position of FIG. 6. Latch extender 30 is pivoted in the direction of arrow 90 of FIG. 6. Advantageously, after extender 30 is rotated to its extended position illustrated in FIG. 7, first and second side legs 36 and 38 act as spring beams so that tangs 48 and 54 apply a spring force against sidewalls 76 and 78 of window hasp 14, respectively, in the directions of arrows 92 and 94, respectively. Such a spring force maintains the extender 30 in the extended position of FIG. 7. Because sidewalls 76 and 78 of hasp 14 are slightly ramped, and due to the outwardly directed spring forces applied by tangs 48 and 54, extender 30 does not move upwardly in the direction of arrow 96 as extender 30 engages locking mechanism 16 of vehicle 12. Therefore, extender 30 provides a one-piece construction that is easy to install without separate parts or tools.

Figure 8:
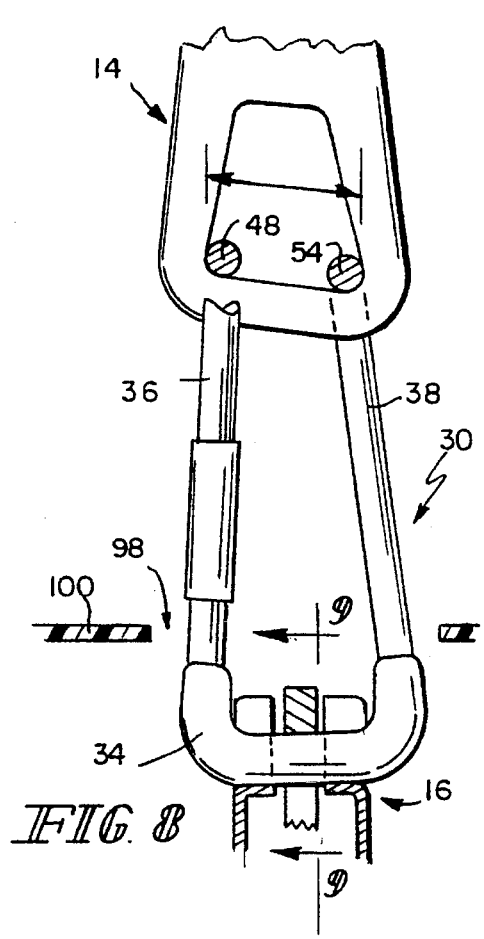
FIG. 8 is a sectional view taken through the latch extender of FIG. 1 illustrating the latch extender coupled to the hasp and to a locking mechanism in the vehicle to secure the window in a partially open position.

FIG. 8 illustrates extender 30 engaged with window hasp 14 and locking mechanism 16 of vehicle 12. Extender 30 extends through an aperture 98 formed in rear panel 100 of vehicle 12 to engage locking mechanism 16 in a conventional manner. Advantageously, tangs 48 and 54 each have a longitudinal axis 50 and 56, respectively, which is substantially perpendicular to axis 40 of base 34 which engages locking mechanism 16. This configuration reduces the likelihood that latch extender 30 can be disengaged from hasp 14 since extender 30 cannot be rotated to disengage tangs 48 and 54 from hasp 14.

Figure 9:
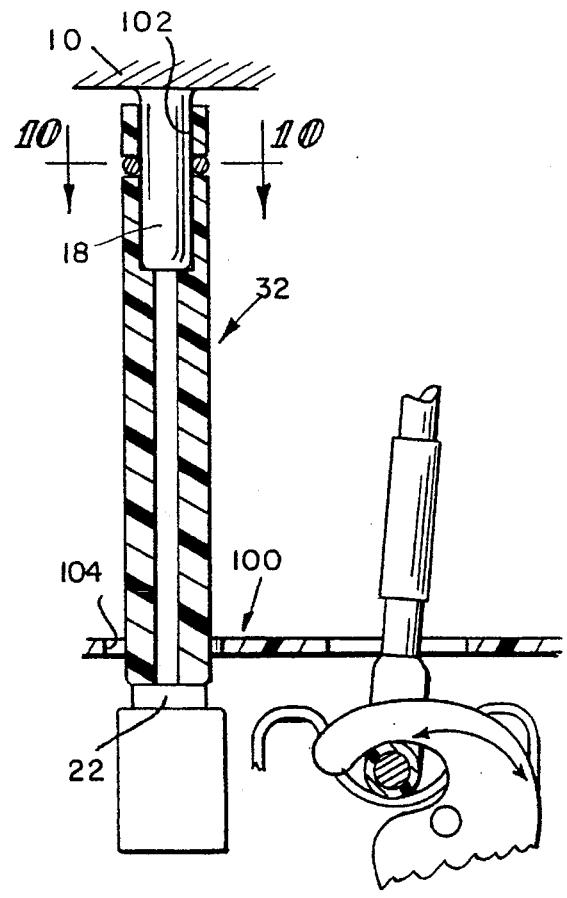
FIG. 9 is a sectional view taken along lines 9—9 of FIG. 8 further illustrating the latch extender engaging the locking mechanism and illustrating details of the auxiliary post coupled to a post of the window for engaging and closing a control switch.
Figure 10:
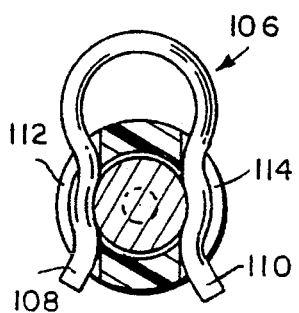
FIG. 10 is a sectional view taken along lines 10—10 of FIG. 9 illustrating details of a spring clip for securing the auxiliary post to the window post.

FIG. 9 illustrates the auxiliary post 32 in detail. Auxiliary post 32 includes a top opening 102 configured to slide over existing post 18 on window hatch 10. Auxiliary post 32 extends through an aperture 104 in panel 100 to engage switch 22 and turn off a rear light and the security system of the car when the latch extender 30 is engaged with locking mechanism 16. Since the diameter of opening 102 formed in auxiliary post 32 is slightly larger than a diameter of post 18, a hairpin clip spring 106 is provided to secure auxiliary post 32 to post 18. As illustrated in FIG. 10, clip spring 106 includes a pair of opposing spring arms 108 and 110 which enter slots 112 and 114 on opposite sides of auxiliary post 32, respectively, and engage post 18 to secure auxiliary post 32 to post 18.

Figure 11:
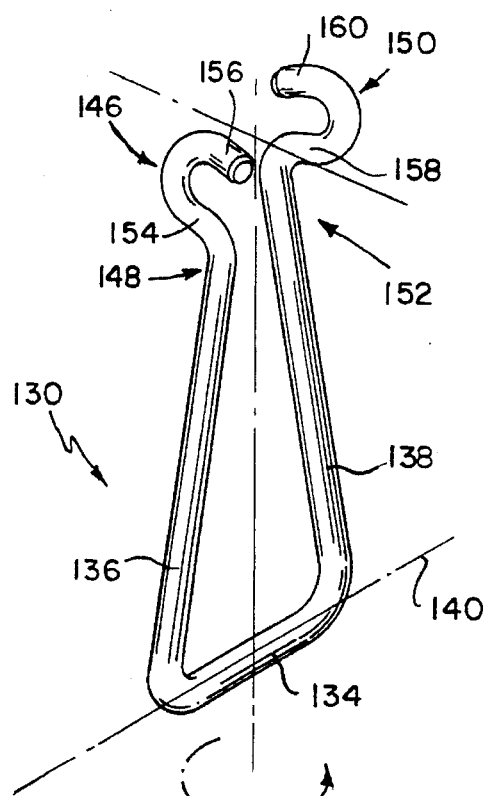
FIG. 11 is a perspective view illustrating a second embodiment of the present invention which includes a base, a pair of side legs, and a U-shaped hook attached to a distal end of each side leg.
Figure 12:
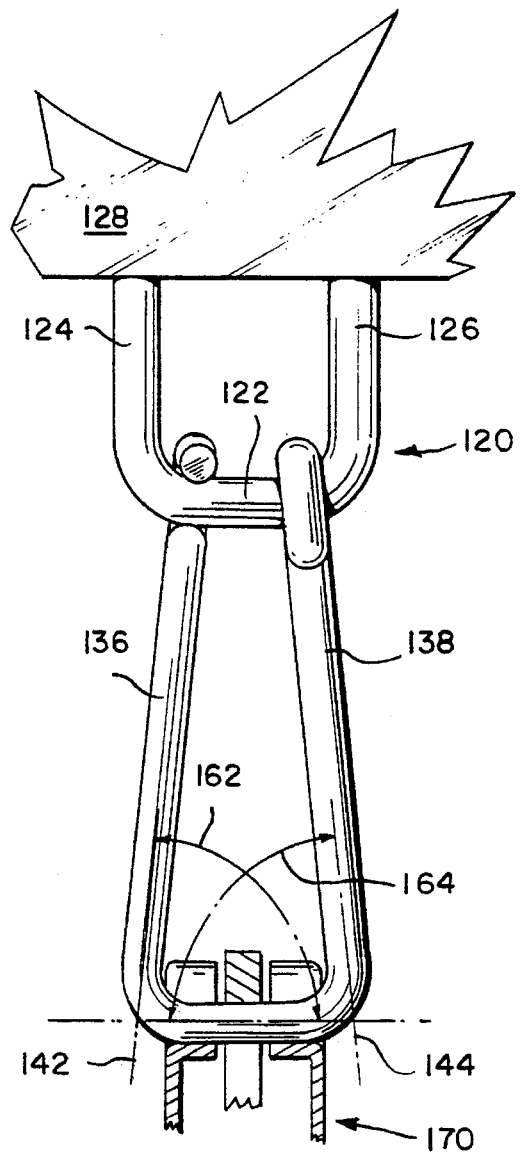
FIG. 12 illustrates the latch extender of FIG. 11 with the U-shaped hooks coupled to a window hasp and with a base coupled to a locking mechanism of the vehicle to secure the window in a partially open position.
Figure 13:
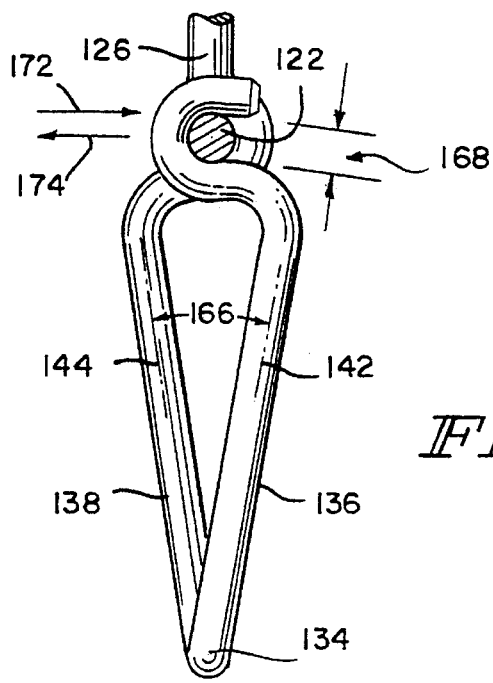
FIG. 13 is a sectional view taken through the latch extender of FIG. 12 illustrating further details of the latch extender.

Another embodiment of the present invention is illustrated in FIGS. 11–13. This second embodiment is designed for use with a generally U-shaped window hasp 120 having a base 122 and opposite side legs 124 and 126 coupled to a window or hatch 128 as illustrated in FIG. 13. This embodiment of the extender 130 includes a base 134 and first and second side legs 136 and 138. Base 134 has a longitudinal axes 140 and side legs 136 and 138 have longitudinal axes 142 and 144, respectively. Latch extender 130 includes a first hook 146 formed integrally with distal end 148 of first side leg 136. Extender 130 also includes a second hook 150 formed integrally with distal end 152 of second side leg 138. Hook 146 is generally U-shaped and includes a lower shoulder 154 and a top arm 156 generally parallel shoulder 154. A longitudinal axis of shoulder 154 and top arm 156 are both generally perpendicular to axis 140 of base 134. Hook 150 is also generally U-shaped and includes a lower shoulder 158 and a top arm 160 which is generally parallel to shoulder 158. An axis of shoulder 158 and an axis of top arm 160 are each generally perpendicular to axis 140 of base 134. Hooks 146 and 150 extend away from side legs 136 and 138 in opposite directions.

First and second side legs 136 and 138 converge axially relative to axis 148 of base 134 as the distance from base 134 increases. As illustrated in FIG. 12, longitudinal axis 142 of first side leg 136 is aligned at an angle 162 relative to axis 140 of base 134. Axis 144 of second base 138 is aligned at an angle 164 relative to axis 140 of base 134. Preferably, angles 162 and 164 are about 85°. In the illustrative embodiment, angles 162 and 164 are 83° 49' 43". In addition, as illustrated in FIG. 13, first and second side legs 136 and 138 are radially displaced about axis 140 of base 134. In other words, first and second side legs 136 and 138 diverge radially relative to axis 140 of base 134. Preferably, first and second side legs 136 and 138 are aligned at about a 20° angle relative to each other as illustrated by angle 166. In the illustrated embodiment, angle 166 is 20° 4' 12".

Also illustrated in FIG. 13, base 122 of window hasp 120 has a diameter of about 0.2425 inch. Shoulders 154 and 158 of hooks 146 and 150 are separated from arms 156 and 160, respectively, by distance illustrated by dimension 168 and FIG. 13. Illustratively, dimension 168 is 0.2375 inch. Therefore, dimension 168 is slightly less than the diameter of base 122 of hasp 120. Therefore, hooks 146 and 150 provide spring means to apply a spring force against base 122 of hasp 120 to secure extender 130 to hasp 120. As illustrated in FIG. 12, base 134 engages locking mechanism 170 to hold window 120 in a partially open position. Oppositely directed hooks 148 and 150 which extend generally perpendicularly to axis 140 of base 134 prevent extender 130 from being removed when base 134 engages locking mechanism 170. Locking mechanism 170 must be opened manually using a key or a release mechanism in order to release extender 130.

Side leg 136 also applies a spring force to base 122 in the direction of arrow 172 in FIG. 13. Side leg 138 applies a spring force to base 122 in the direction of arrow 174.

In the illustrated embodiment, latch extenders 30 and 130 are made from SAE 1177 cold rolled rod. It is understood, however, that other types of formed metal materials or casted metal materials may be used in connection with the present invention. In addition, latch extenders 30 and 130 may be molded from a plastic material using known techniques. Therefore, the invention is not limited to the specific type of material used to make the extenders.

Although the invention has been described in detail with reference to a certain preferred embodiment, variations and modifications exist within the scope and spirit of the invention as described and defined in the following claims.

What is claimed is:

1. A latch extender for separating a hasp normally configured to directly engage a locking mechanism to a spaced apart position from the locking member for providing a locking connection between the hasp and locking member, the latch extender comprising:

a rigid base means for engaging the locking mechanism;

a first side leg extending upwardly from the base, the first side leg having a proximal end coupled to the base and a distal end;

a second side leg extending upwardly from the base spaced apart from the first side leg, the second side leg having a proximal end coupled to the base and a distal end;

a first tang means formed at the distal end of the first side leg for springingly engaging the hasp at a first corner location thereon; and a second tang means formed at the distal end of the second side leg for springingly engaging the hasp at a second and axially spaced apart corner location from the first corner location; and wherein the first and second tang means engage the hasp at the spaced apart corner locations and press against the hasp at the spaced apart corner locations respectively to rigidly hold the latch extender and couple the latch extender to the hasp while restraining axial and rotary movement of the tang means from their corner locations on the hasp while at the same time providing for a rigid spaced apart connection between the hasp and the locking member.

2. The latch extender of claim 1, wherein the base has a longitudinal axis, the first tang has a longitudinal axis that is aligned generally normal to the longitudinal axis of the base, and the second tang has a longitudinal axis that is aligned generally normal to the longitudinal axis of the base.

3. The latch extender of claim 2, wherein the first side leg has a longitudinal axis, the second side leg has a longitudinal axis, the longitudinal axis of the first tang is aligned at an acute angle relative to the longitudinal axis of the first side leg, and the longitudinal axis of the second tang is aligned at an acute angle relative to the longitudinal axis of the second side leg.

4. The latch extender of claim 1, wherein the first and second tang means extend away from the first and second side legs, respectively, in opposite directions.

5. The latch extender of claim 1, wherein the first side leg and the second side leg converge axially relative to a longitudinal axis of the base means as the distance of the first and second side legs from the base means increases.

6. The latch extender of claim 1, wherein the first side leg and the second side leg diverge radially relative to a longitudinal axis of the base means as the distance of the first and second side legs from the base means increases.

7. The latch extender of claim 6, wherein the first side leg and the second side leg are radially spaced apart by about 10 degrees relative to the longitudinal axis of the base means.

8. The latch extender of claim 1, wherein the first and second tang means are generally U-shaped hooks formed on the distal ends of the first and second side legs, respectively, for engaging the hasp to couple the extender to the hasp.

9. The latch extender of claim 8, wherein the first and second generally U-shaped hooks extend away from the first and second side legs, respectively, in opposite directions.

10. The latch extender of claim 8, wherein the first and second generally U-shaped hooks each include a shoulder means and an arm means spaced apart form the shoulder means, the shoulder means and the arm means being configured to apply a spring force to the hasp to couple the extender to the hasp.

11. A latch extender configured to be coupled to a hasp of a pivotable hatch of a vehicle and to engage a locking mechanism that is normally in direct engagement with the hasp to hold the hatch in a partially open position spaced from and coupled to the locking mechanism, the latch extender comprising:

a rigid body portion including a base means for engaging the locking mechanism;

a coupling member coupled to the body portion, the coupling member comprising a pair of spaced apart legs each extending away from the body portion and having a free end means for applying a spring force to the hasp at spaced apart axial separated corner points thereon to couple the body portion to the hasp at the spaced apart axial points and to position the base means at a predetermined distance from the hasp so that the pivotable hatch remains in a partially open position upon engagement of the base means with the locking mechanism; and wherein the spring force applied to the hasp at the spaced apart axial points restrains axial and rotative movement of the latch extender with respect to the hasp to provide the rigid spaced apart coupling of the hasp and locking mechanism.

12. The latch extender of claim 11, wherein the legs are formed integrally with the body portion.

13. The latch extender of claim 11, wherein the legs are configured as spaced apart spring beams for applying the spring force to the hasp and means for engaging the hasp to couple the spring beams to the hasp.

14. The latch extender of claim 11, wherein the coupling member includes a pair of generally U-shaped hooks configured to apply the spring force to the hasp to couple the extender to the hasp.

15. The latch extender of claim 11, wherein the first side leg and the second side leg converge axially relative to a longitudinal axis of the base means as the distance of the first and second side legs from the base means increases, and wherein the first side leg and the second side leg diverge radially relative to a longitudinal axis of the base means as the distance of the first and second side legs from the base means increases.

16. A kit system comprising a latch extender configured to hold pivotable hatch of a vehicle in a partially open position and a switch post extender to close an electrical switch indicating that the pivotable hatch is open, the kit system comprising:

a one piece latch extender including a base means for engaging a locking mechanism of the vehicle and coupling member means formed on the latch extender, the coupling member for applying a spring force to two axial spaced apart locations on a hasp on the hatch of the vehicle to couple the latch extender to the hasp and to press against the hasp at the two spaced apart axial locations to position the base means at a predetermined distance from the hasp and to restrain axial movement of the base means with respect to the hasp so that the pivotable hatch remains in a partially open position upon engagement of the base means with the locking mechanism; and an auxiliary post extender means for attaching to a switch post also located on the hatch of the vehicle to engage and close the electrical switch when the pivotable hatch is in the partially open position.

17. The system of claim 16, wherein the auxiliary post extender means is formed to include a longitudinal opening at one end configured to slide over the switch post of the hatch.

18. The system of claim 17, wherein the auxiliary post extender means is formed to include a pair of slots communicating with the longitudinal opening, and further comprising a spring clip located in the slots for engaging the post of the vehicle to secure the auxiliary post to the post of the vehicle.

* * * * *